XR 3,529,083

SYSTEM FOR PRODUCING HOLOGRAPHIC INFORMATION

Filed Feb. 14, 1967

SYSTEM FOR PRODUCING HOLOGRAPHIC INFORMATION

Filed Feb. 14, 1967

4 Sheets-Sheet 3

Sept. 15, 1970 R. L. NELSON ET AL 3,529,083
SYSTEM FOR PRODUCING HOLOGRAPHIC INFORMATION
Filed Feb. 14, 1967 4 Sheets-Sheet 4
Fig. 11
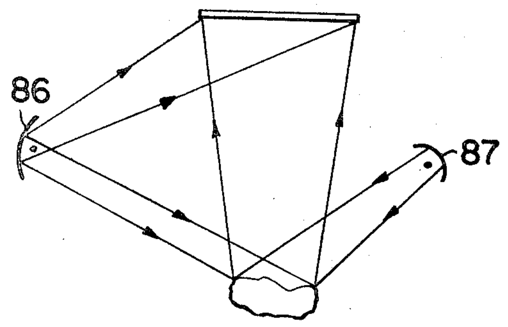
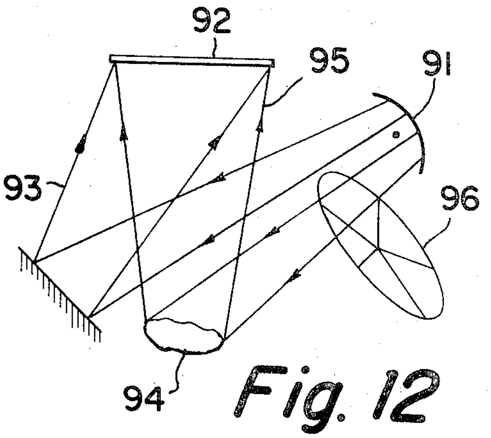
Fig. 12
Fig. 13
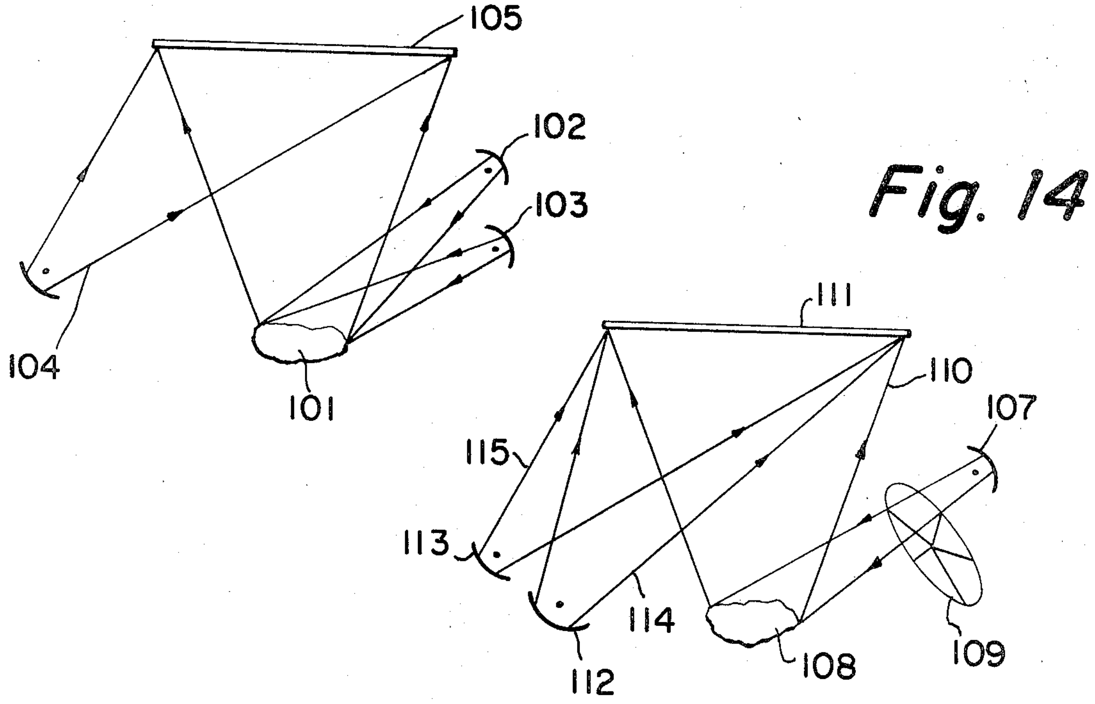
Fig. 13, Fig. 14

United States Patent Office 3,529,083
Patented Sept. 15, 1970

3,529,083
SYSTEM FOR PRODUCING HOLOGRAPHIC INFORMATION

Richard L. Nelson, Worthington, Ohio, and Daniel S. St. John, Hockessin, Del., assignors to Holotron Corporation, Wilmington, Del., a corporation of Delaware Filed Feb. 14, 1967, Ser. No. 616,086
Int. Cl. G02b *23/12, 27/22;* H04n *5/84*
U.S. Cl. 178—6.8 32 Claims

ABSTRACT OF THE DISCLOSURE

A method of producing and detecting holographic information of large object scenes capable of transmission by means of conventional television systems in which the object scene is illuminated with incoherent light which has been intensity-modulated with coherent microwave radiation. The holographic information, i.e., the amplitude and phase information of the object scene is detected by detecting light intensity variations reflected from the object and either simultaneously or thereafter mixing a reference signal coherent with the microwave modulating radiation with the detected signal.

BACKGROUND OF THE INVENTION

This invention resides generally in the science of holography and relates specifically to a method of making holograms of large scale visual objects such as, for example, are encountered in television systems.

Holography is a relatively new scientific technology in which the wave front pattern of light radiation reflected or diffracted from an object or transmitted through an object is recorded on some recording medium such that when a point source of monochromatic light is directed to the recorded wave front pattern, a 3-dimensional image of the object is formed. A hologram is the recorded wave front pattern from which the reconstructed image of the original object can be obtained. Leith and Upatnieks have developed a method for making holograms in which a reference beam of coherent light is superimposed at a recording plane in space on an object beam of radiation coherent with the reference beam and which is either reflected or diffracted from the object or transmitted through the object to be recorded. The reference beam is angularly displaced from the object beam or "off-axis." This causes an interference pattern to be set up at the recording plane which contains both the intensity and the phase information of the wave front emanating from the object. One way to produce a hologram or to record this interference pattern at the recording plane is to expose photosensitive film placed at the plane. By directing a beam of coherent light through the photographic film or hologram, a 3-dimensional virtual image of the original object is usually formed by one of the first order diffracted beams and can be viewed by looking through the hologram as if it were a window. Mathematics that illustrate the concept of off-axis holography involving the making of a hologram on a photographic film will be of aid in understanding the present invention and will therefore be supplied hereinafter.

In previous applications of the aforementioned technique of producing holograms, the means available for producing coherent radiation has limited the size of the object and the size of the hologram that can be used. Since it is extremely desirable to be able to view the images formed by the hologram optically, it is desirable to use coherent light in the visible region of the light spectrum for producing and reconstructing the holograms. However, the size of the field of coherent light available is presently limited to the coherence length of the light produced by lasers of sufficient power and intensity to produce acceptable holograms. It would be desirable to produce holograms by the utilization of incoherent visible light in order to obtain wide fields and larger depths of view.

Another problem resulting from the utilization of present holographic techniques is in television, wherein it is desired to transmit the information needed to produce a hologram by means of present television techniques. According to a paper published by Leith, Upatnieks, Hildebrand, and Haines in the October 1965 edition of the Journal of the Soicety of Motion Pictures and Television Engineers, vol. 74, No. 10, page 893, the frequency bandwidth necessary to transmit sufficient information to produce a hologram is inversely proportional to the wavelength of the light radiation used in producing the hologram. In order to transmit hologram information in the visible spetcrum, an extremely wide bandwidth would be necessary, which is extremely undesirable in present communication systems. It would be desirable to reduce the bandwidth necessary to transmit all the information needed to produce a hologram capable of producing a visible image.

As may be already apparent to those skilled in the art, the use of lasers has greatly extended the application of holography, but these applications are still hampered by the limitation of power and coherence length in present-day lasers. This is true especially in television systems in which very large scenes are to be viewed. It therefore would be desirable to be able to produce holograms suitable for television transmission without the utilization of lasers. Such a system should be readily adapted to transmit color information about objects being viewed.

It is therefore an object of this invention to devise a means of producing holograms which eliminates the necessity of lasers.

It is a more general object of this invention to devise a method of making holograms which utilizes incoherent visible light to illuminate the object scene.

It is another object of this invention to devise a means for producing holograms of very large scenes.

It is still another object of this invention to devise a means for producing holograms of very large scenes by illuminating them with incoherent white light.

It is still another object of this invention to devise a means and method for decreasing the time-bandwidth product necessary to transmit the information needed to produce holograms.

SUMMARY OF THE INVENTION

Briefly, the inventive concept is to obtain holographic information from an object scene illuminated by radiation of a relatively high frequency, the intensity of which has been modulated at a substantially lower frequency. The high frequency radiation (for example, visible light or X-rays) is used as a carrier and its reflection and transmission properties define the appearance of the object scene. The lower frequency modulation is used to impose coherence on the carrier beam and the amplitude and phase of the modulations provide the holographic information. Demodulation can be accomplished with a suitable detector that is responsive to the high frequency radiation (for example, a photodetector if white light is used) and which is capable of responding to changes in the intensity at the modulation frequency. In one method, the phase and amplitude information can be obtained by first mixing the modulated wave from the object scene with a reference wave which creates a standing wave pattern at a hologram surface similar to the pattern recorded in a conventional hologram. This wave pattern can be detected and used to produce a hologram, for example, by displaying the wave pattern on a cathode ray tube and photographing it. A second method of obtaining the amplitude and phase information of the modulations at the hologram surface is to demodulate the signal from the object scene directly (for example, by filtering the photodetector output) and mixing this signal with a reference signal to give a measure of the amplitude and phase of the modulation. This information can be operated on mathematically and, for example, displayed on a cathode ray tube and photographed to produce a hologram.

The inventive concept is distinctly pointed out in the appended claims. However, to understand some of the more practical embodiments of the invention, together with the underlying concepts and mathematical principles behind the invention, reference is made to the following specification which should be read in conjunction with the following figures in which:

BRIEF DESCRIPTION OF THE DRAWINGS

FIG. 11 shows another method of making holograms according to the present invention; and FIGS. 12, 13 and 14 show three methods of making colored holograms.

DETAILED DESCRIPTION OF THE DRAWINGS

Figure 1:
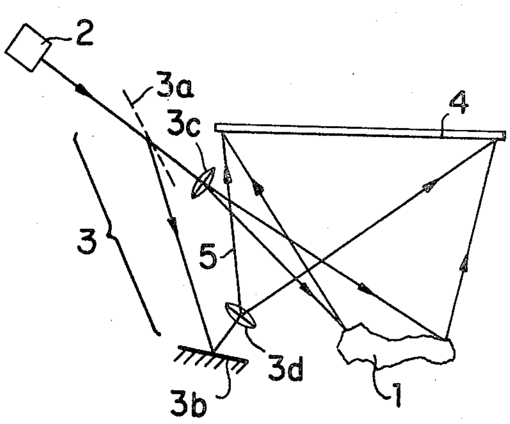
FIG. 1 shows a setup for producing conventional off-axis holograms.

Referring now to FIG. 1, there is shown a conventional means for making holograms, as described by Leith et al., in patent application Ser. No. 503,993, wherein an object 1 is illuminated with a coherent light source 2 by means of conventional optical equipment 3 including, in part, a beam splitter 3*a* and a lens 3*c*. The light from source 2, which may comprise a laser, impinges by means of beam splitter 3*a*, a mirror 3*b*, and another lens 3*d*, directly on a plane position in space 4, at which position light reflected or diffracted from the object 1 also impinges. Since the two light beams impinging at the plane 4 are mutually coherent, (in this case because they emanate from a common laser source) they set up an interference pattern at the plane 4. By recording the intensity of these two light beams (as is done with a photographic film), the amplitude and phase information of the wavefront emanating from object 1 can be recorded. Thus, by recording this interference pattern on a photographic film and producing a film transparency or hologram, a reconstructed image of the object 1 may be formed by passing coherent radiation through the hologram.

The mathematics necessary to explain the principles of off-axis holography as illustrated in FIG. 1 are given below. In order to clarify the differences between the conventional holographic method and the invention, the definitions of the amplitude and intensity of radiation as used herein should be borne in mind. The amplitude of a wavefront is defined as the magnitude of the electric vector of the electromagnetic wave which describes the radiation. The intensity of light is the time average of the radiant energy flux and thus is proportional to the square of the amplitude. The mathematical analysis given below applies to the recording and reconstruction of a single point on the object and in the general case must include the effect of all the points in the object scene. This more general and rigorous treatment can be found in the literature and is not required in order to show the difference between this invention and the principles in conventional holography.

The coherent light emanating from the source 2 may have a radian frequency represented by $\omega_0$ and a wavelength of $\lambda_0$. This light is reflected or diffracted from the object to the recording plane 4, defined by the coordinates $x$ and $y$, and may be represented mathematically as a wave front $U_o$:

$$U_o=[a_o(x,y)\cos(\omega_0 t+\phi(x,y))] \quad (1)$$

where: $a_o(x,y)$ is the amplitude of the wave front and $\phi$ is the phase.

Another beam 5, from the light source, bypasses the object and is directly incident on the recording plane 4, making an angle $\theta$ with the normal to the recording plane. This beam is usually called a reference beam. In order to simplify the following analysis, the reference beam is represented by a plane wave although use of a non-planar wave (as illustrated in FIG. 1) does not alter the underlying principles. The reference beam wave front is:

$$U_r=a_r\cos[\omega_0 t+\alpha x] \quad (2)$$

where:

$$\alpha=\frac{2\pi\sin\theta}{\lambda_o} \quad (3)$$

and $a_r$ is the amplitude of the reference wave.

At the hologram plane 4 the two beams $U_o$ and $U_r$ are added together so that the total light amplitude is given by:

$$U(x,y,t)=U_o+U_r=a_o(x,y)\cos[\omega_0 t+\phi(x,y)]+a_r\cos[\omega_0 t+\alpha x] \quad (4)$$

This light is recorded by photographic film placed at 4 which, being an energy detector, records the time average of the square of the light amplitude, i.e., the intensity of the light. Thus the mathematical expression for the hologram recorded on the photographic film is:

$$I(x,y)=(U(x,y,t))^2=a_o^2(x,y)\cos^2[\omega_0 t+\phi(x,y)]+a_r^2\cos^2(\omega_0 t+\alpha x)+2a_o(x,y)a_r\cos[\omega_0 t+\phi(x,y)]\cos[\omega_0 t+\alpha x] \quad (5)$$

The last term in Equation 5 can be written as:

$$a_o(x,y)a_r\{\cos[2\omega_0 t+\phi(x,y)+\alpha x]+\cos(\alpha x-\phi(x,y))\} \quad (6)$$

Taking the time average of these terms yields:

$$I(x,y)=\tfrac{1}{2}a_o^2(x,y)+\tfrac{1}{2}a_r^2+a_o(x,y)a_r\cos[\alpha x-\phi(x,y)] \quad (7)$$

This final expression, Equation 7, defines the interference pattern recorded by the photographic film. In Equation 7 the last term is of interest in holography since it is this term that upon reconstruction, carries the intensity and phase information necessary to generate a 3-dimensional image of the original object.

For the reconstruction, let us assume that a coherent beam of light with a planar wave front:

$$U_c=a_c\cos[\omega_0 t+\alpha x] \quad (8)$$

is used to illuminate the hologram so that a transmitted beam through the hologram contains the following term:

$$a_0(x,y)a_1a_c \cos [\omega_0 t+\alpha x] \cos [\alpha x-\phi(x,y)] \quad (9)$$

which can be written as:

$$\tfrac{1}{2}\, a_0(x,y)a_1a_c\{\cos [\omega_0 t+2\alpha x-\phi(x,y)] + \cos [\omega_0 t+\phi(x,y)]\} \quad (10)$$

Upon examination of the last term of this expression it can be seen that it is proportional to the wave front of the object beam incident upon the hologram plane. Thus a reconstructed wave front of the object has been made resulting in a 3-dimensional image of the object.

In the method described with respect to FIG. 1 the holograms are produced from the fundamental waves of the electromagnetic radiation emanating from the source 2. Thus, it is necessary that the fundamental radiation be coherent; that is to say, the individual wavelengths must have a constant phase relation over a distance large enough to include the maximum path length difference between the reference beam and the portion of light reflected from the different points on the object and on to different points at the recording plane 4. Since the laser is presently the most practical source of coherent light in the visible spectrum, the size of the object and the size of the hologram itself has been limited to the practical length of coherency of a laser beam. Thus, it is apparent that the use of lasers has imposed a sever limitation on the art of holography.

One way around the problem of the short coherence length of laser beams is to use longer wave radiation, such as microwaves which, in principle, can be made coherent for very long distances and for very long periods of time. However, long wave microwave radiation is quite penetrative to ordinary objects and thus an image of an object produced by microwave illumination would have much different characteristics than when viewed by reflected light in the visible range. Additionally, it is obviously more desirable to reconstruct images with visible light rather than microwave radiation so that they can be viewed optically.

Figure 2:
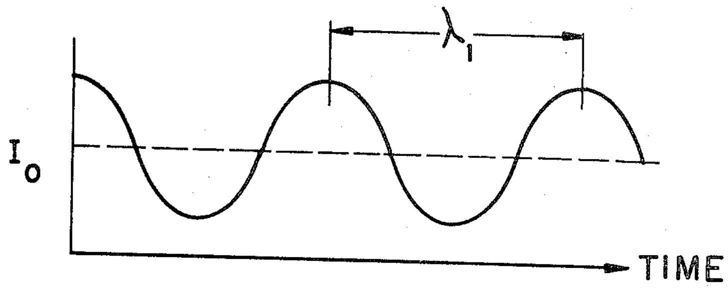
FIG. 2 shows the intensity of light as a function of time after it has been modulated by a sine wave with a wavelength long compared to the wavelength of the light.

In this invention, ordinary incoherent white light is intensity-modulated at a lower frequency before it is used to illuminate the object and the hologram recording plane. In the graph of FIG. 2, light with an average intensity $I_o$ is modulated at a radian frequency $\omega_1$ and wavelength $\lambda_1$ so that the time expression of intensity I is:

$$I=I_o\left[1+m \cos \left(\omega_1 t+\frac{2\pi z}{\lambda_1}\right)\right] \quad (11)$$

Since the method of modulating the light, in most embodiments, but not all, is not sufficient to completely block the light, the fraction of light modulated is represented by the small letter $m$.

In one embodiment of this invention, light modulated as shown in FIG. 2 is used in a similar manner to the unmodulated light source 2 shown in FIG. 1, to illuminate the object and to produce a reference beam, the combination of which produces a standing wave pattern at a recording plane.

Figure 3:
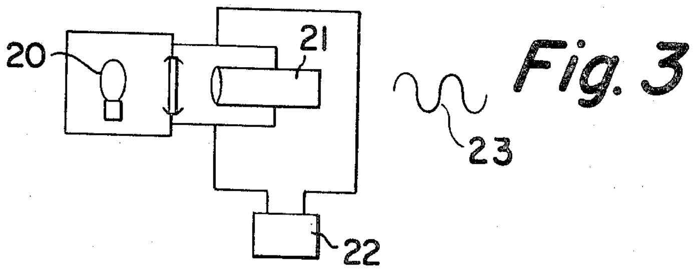
FIG. 3 shows one means of modulating the light wave illustrated in FIG. 2.
Figure 4:
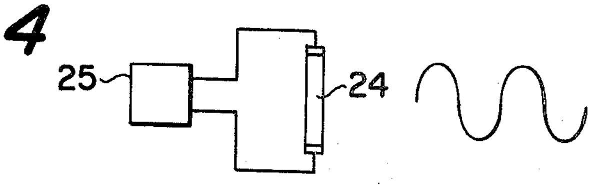
FIG. 4 shows another means of modulating light as shown in FIG. 2.

FIGS. 3 and 4 show two different means of producing the modulated light illustrated graphically in FIG. 2. In FIG. 3 a white light source 20 directs a beam of white light through a shaded modulator 21, which may be a Kerr cell. The light is then modulated with a source of electrical signals 22 oscillating at a frequency much lower than the frequency of the white light emanating from the source 20. The resultant output of the modulator 31 is a modulated white light wave 23.

FIG. 4 shows another means of obtaining a source of modulated high frequency radiation. This is to simply activate a white light lamp 24 with a high voltage source 25 oscillating at the desired modulating frequency. Other forms of obtaining modulated carrier radiation will be readily apparent to those skilled in the art.

Figure 5:
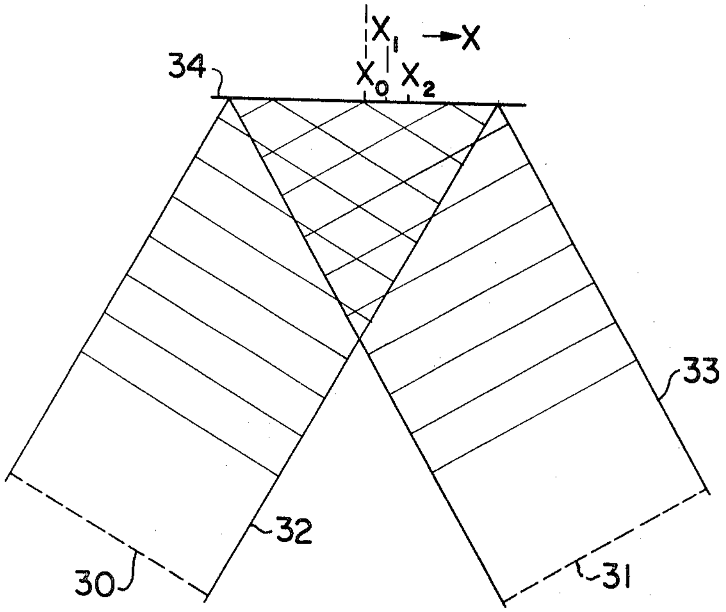
FIG. 5 shows two collimated beams of light modulated as illustrated in FIG. 2 intersecting at a plane in space at one instant in time.

In FIG. 5 the pattern at the hologram plane is shown when two beams of modulated electromagnetic radiation intersect. FIG. 5 shows a first source 30 and a second source 31, which produce two collimated beams of intensity modulated light 32 and 33, respectively, which intersect at a hologram plane 34 to produce a standing wave pattern. A series of linear parallel lines intersecting the path of the light beams 32 and 33 illustrate the wave fronts of the modulations of the light beams 32 and 33. Although in actual practice these wave fronts may have some curvature, for purposes of clarity and ease of illustration, it will be assumed that the light sources 30 and 31 are perfectly collimated and that the wave fronts of the beams 32 and 33 are planar.

The parallel lines are spaced at distances equal to the wavelength of the modulating radiation and illustrate the maximum intensity contours of the wave fronts at time=0. A standing wave pattern is produced at the hologram plane 34 in all directions from a point of origin $x_0$. At $x_0$, the two beams intersect so that at time $t=0$, the two beam intensities are at their maximum so that at the hologram plane, the total intensity is at a maximum. However, at time $t=0$, at points $x_1$ and $x_2$, the beam intensities are not at their maximum and the sum of the two beam intensities varies, depending upon the distances away from $x_0$, the wavelength of the modulations, and the fraction of the light that is modulated.

Figure 6:
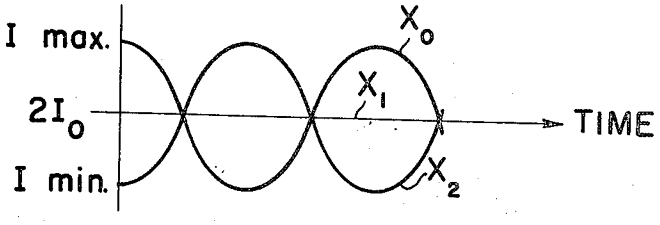
FIG. 6 shows the intensity of light as a function of time observed at 3 points on the detector plane wherein the two collimated beams of light of FIG. 5 intersect.

FIG. 6 illustrates the light intensity at the hologram plane 34 as a function of time at specified points $x_0$, $x_1$ and $x_2$ on the hologram plane. As can be seen at $x_0$ at time $t=0$ an intensity maximum is observed, but as time moves on, the intensity at $x_0$ varies sinusoidally about the average intensity $2I_0$. At point $x_1$, when one beam is at a maximum, the other beam is at its minimum, so that the resulting intensity is nearly constant with a value of $2I_0$. At the point $x_2$ and at time $t=0$, both beam intensities are at a minimum and the variations in intensity with time are the inverse of the variations at point $x_0$.

The magnitudes of the intensities at the maximum and minimum points will simply be the sum of the two modulated beams of radiation 32 and 33. It is thus seen that at the hologram plane a standing wave pattern occurs with oscillations of maximum intensity that are spaced uniformly at a distance that depends upon the angle of incidence of the two beams and the frequency of the modulations. A suitable detector placed at the hologram plane will record the standing wave pattern and, as will be shown hereinafter, will contain all the information necessary to reconstruct an image of the object. Hereinafter, the information, in whatever form, which is utilized to reconstruct images of objects according to this invention will be termed holographic information or, in some cases, a hologram, although it is to be understood that the manifestation of this information may differ in some respects from holograms formed according to conventional off-axis holography.

Figure 7:
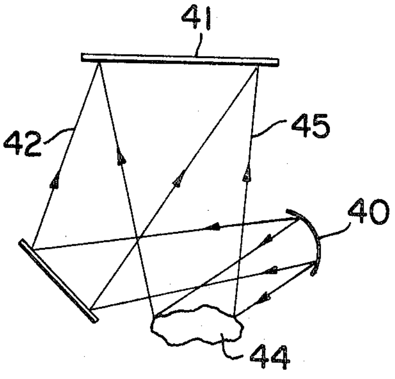
FIG. 7 shows one method of making holograms according to the present invention.

The above principles are utilized in one embodiment of the invention which is shown diagrammatically in FIG. 7. In this embodiment there is an analogy with the methods of conventional optical holography, in that a second beam or reference beam which is modulated coherently with the illuminating beam is directed onto the hologram plane providing a means for measuring the phase of the modulated waves from the object. As shown in FIG. 7, a source of intensity modulated light 40 illuminates a hologram plane 41 directly to provide a reference beam 42. An object 44 is also illuminated from source 40 so that an object beam 45 reflected by the object 44 impinges on the hologram plane 41. At the hologram plane 41 a suitable demodulating detector is placed so that the information necessary to reconstruct a 3-dimensional image of the object 44 can be obtained. In order to explain the principle of this invention mathematically, it will be necessary to refer to the following equations.

In this analysis, as in the previous analysis of the principles of conventional holography using coherent light, the mathematics illustrate the underlying principles, and apply to a single point in the object scene. The actual signal received at the hologram detector plane then is a summation of signals from all the points of the object space. The intensity of light reflected by the object 44 and contained in the object beam 45, is represented by:

$$I_{45}=I_o(x,y)[1+m' \cos (\omega_1 t+\phi_1(x,y)] \qquad (12)$$

where $I_o(x,y)$ is the average intensity of the modulated object beam as reflected from the object, $\omega_1$ is the modulating radian frequency, $\phi_1$ is the phase difference introduced in the modulations of the object beam because of the distance it has traveled in going from the source to the object and thence to the detector, and $m'$ is the fraction of the object beam that is intensity-modulated.

In this illustrative example, the reference beam 42 is assumed to be a plane wave and is represented by:

$$I_{42}=I_{ro}[1+m \cos (\omega_1 t+\alpha x)] \qquad (13)$$

where:

$I_{or}$ is the average intensity of the reference beam, $$\alpha=\frac{2\pi \sin \theta}{\lambda_1}$$

and $\theta$ is the average angle the reference beam 42 makes with the normal to the hologram plane.

The light signal at the hologram plane is given by the sum of the object and the reference beams or $$I_h=I_{45}+I_{42}$$

Only the terms including the modulating frequency $\omega_1$ are of interest, so that a band-pass filter may be used for filtering all but the frequency terms $\omega_1$. Therefore, the intensity of light $I_h$ at the hologram plane 41 after filtering may be represented by:

$$I_h=I_o(x,y)m' \cos [\omega_1 t+\phi_1(x,y)]+I_{ro}m \cos [\omega_1 t+\alpha x] \qquad (15)$$

In order to produce a hologram from this light intensity information it is necessary to detect it at various points on the hologram plane 41. Of the various possible methods for detecting this intensity, two will be described, although it is noted that under present day technology, these methods are limited by the quality of the equipment available, which will require further development for commercial applications.

One method would be to detect the magnitude of the square of the light signal intensity averaged over an interval of time. This method may be thought of as being analogous to the utilization of an energy detector such as the photographic film used in the off-axis holography method described with respect to Equations 1–10 with the difference being that in the off-axis holography method, the film was used to detect the square amplitude, whereas in this method, some device must be utilized which will detect the square of the intensity.

Such a device may comprise a photocell, the resistance of which varies with the intensity of light impinging thereon, in conjunction with a voltmeter used to detect the mean square of the voltage produced by the resistance of the photocells. An alternative method consists of passing the signal from the photocell through a rectifying device such as diode. This signal will be the time average of the square of intensity and will be given by the following equation:

$$[V(x,y)]^2=(I_h^2)=(I_o^2(x,y)m'^2 \cos^2]\omega_1 t+\phi_1(x,y)] +(I_{ro}^2 m^2 \cos^2[\omega_1 t+\alpha x])+(2I_o(x,y)I_{ro}m'm \cos [\omega_1 t+\phi_1 x,y] \cos [\omega_1 t+\alpha x]) \qquad (16)$$

where the brackets () represent a time averaged-term.

This equation can be rewritten as:

$$[V(x,y)]^2=\tfrac{1}{2}I_o^2(x,y)m'^2+\tfrac{1}{2}I_{ro}^2m^2+(I_o(x,y)I_{ro}m'm \cos[2\omega_1 t+\alpha x+\phi_1(x,y)])+(I_o(x,y)I_{ro}m'm \cos [\alpha x=\phi_1(x,y)] \qquad (17)$$

It can be seen by comparing these equations with those which outline the conventional holographic process using coherent light, that all the information to reproduce a visual image of the original scent is contained in the hologram that is produced by the modulated, incoherent light. That is, the last term of the Equation 17 is analogous to the last term of Equation 10 which carries the information necessary to reconstruct an image of the object. To reconstruct this image, a hologram transparency is prepared which contains a pattern represented by this latter term so that when illuminated with a point source of monochromatic radiation, a 3-dimensional image will be reconstructed.

In the reconstruction process a frequency of light much higher than that of $\omega_1$, the modulating frequency, can be used. This is possible simply by suitably demagnifying the pattern given by Equation 17 and contained on the transparency used to record this pattern. The amount of reduction is determined by the ratio of the frequency of the radiation used in the reconstruction process to the frequency of the modulations used in the construction process. By this process visible light can be used to reconstruct the image of the object, so that it can be viewed optically. Although the reconstructed image utilizing visible light, perhaps that of a laser beam, will be very much demagniefied as compared to the original object, it will be remembered that the original object itself could be quite large, inasmuch as it was illuminated with ordinary incoherent light that had been modulated at a low frequency.

The second method to be described for detecting the wave front of the object beam is to record directly the intensity and the phase of the object beam at the hologram plane. The light intensity may be measured at the hologram plane by a photocell, as in the first method. By suitably filtering the output of the photocell, the modulated portion of the signal, $$m' I_o(x,y) \cos [\omega_1 t+\phi_1(x,y)]$$

can be detected and the intensity, $I_o(x,y)$ can be measured. The phase of the modulated signal, $\phi_1(x,y)$ can be measured by comparing the filtered output of the photocell with an electrical signal modulated at the frequenccy, $\omega_1$, which acts as the analog of the reference beam used in the first method. In this way, an electrical signal can be generated that is analogous to the last term in Equation 17, i.e., $$I_o(x,y)m'I_{ro}m \cos (\alpha x-\phi_1(x,y)]$$

These signals are generated electronically in a mixing system for each point in the $x$, $y$ detector plane. Thus, this method also provides a process for recording the necessary information required to reconstruct the wavefront from the object, and produce a 3-dimensional image.

Figure 8:
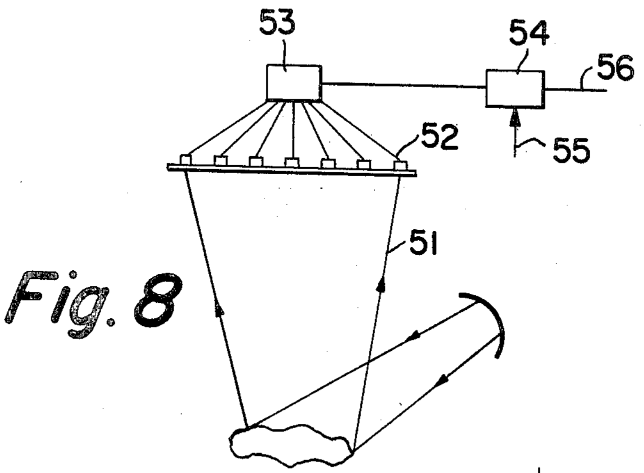
FIG. 8 shows still another method of making holograms utilizing electronics according to this invention.

This method, which eliminates the necessity for a source of a reference beam of light, is shown in block diagram form in FIG. 8. In FIG. 8, the object beam 51 falling on the hologram plane is converted to proportional electric impulses by means of scanning a plurality of photocells 52 positioned at the hologram plane with a scanner 53. The object beam, as converted into electronic impulses, is then fed into a mixing unit 54 where it is mixed with a reference current at 55 oscillating at the modulating frequency. The output 56 of the mixer is an electric current representing the interference pattern between the object wave 51 and the reference wave 55. This current contains all the information necessary to produce a hologram which will reconstruct a 3-dimensional image of the object.

Figure 9:
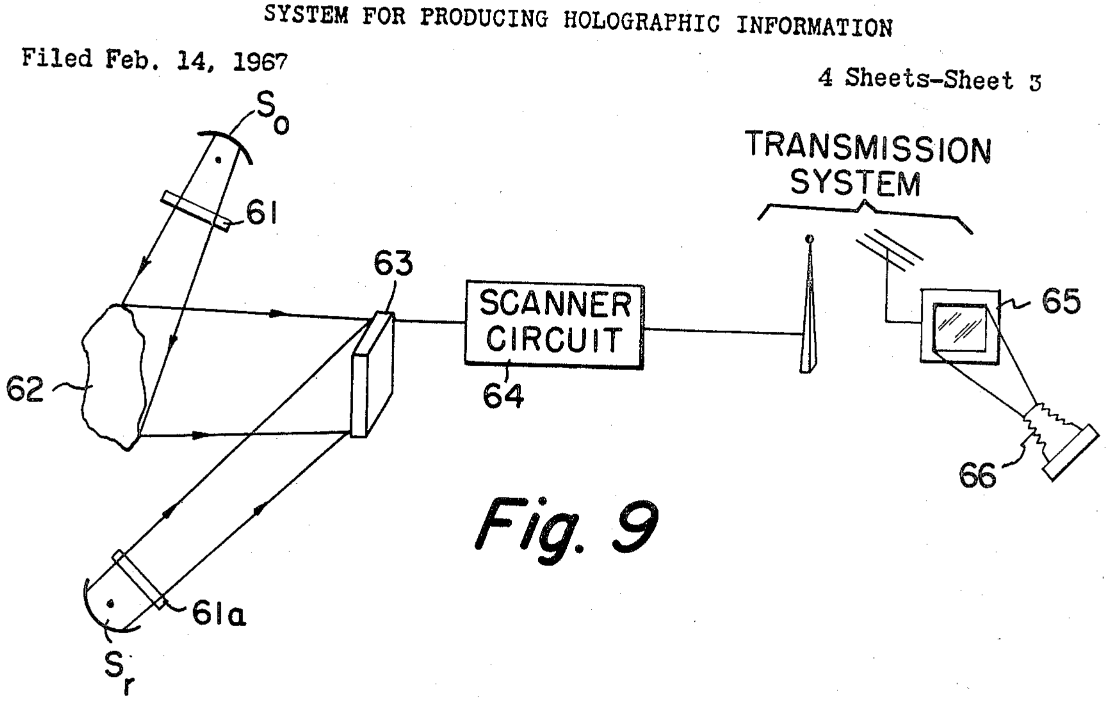
FIG. 9 shows a method whereby this invention is used to transmit holographic information about an object.
Figure 10:
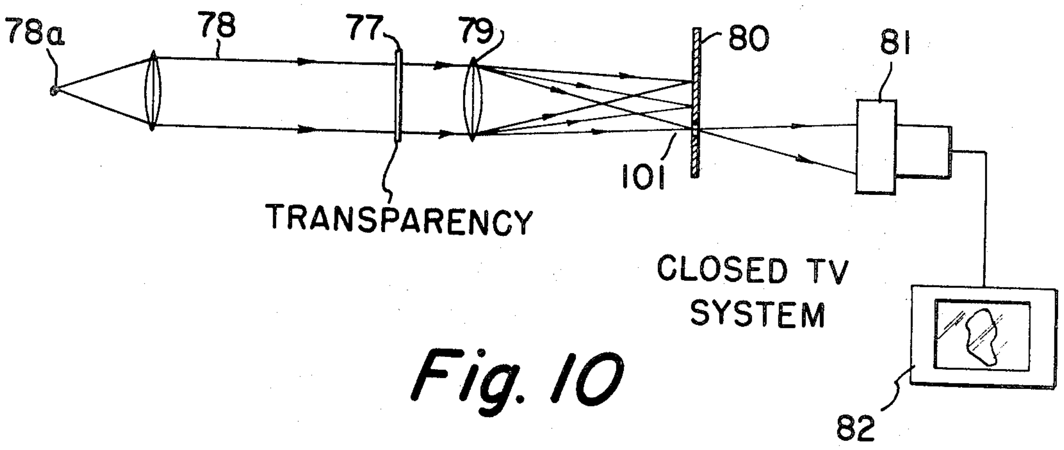
FIG. 10 shows a method whereby the image of the object is displayed.

This invention can be utilized as a method for transmitting holograph images over long distances. With this invention, holographic information about large scenes can be obtained and transmitted without requiring increases in present-day transmission capability. FIGS. 9 and 10 illustrate a two-stage system for collecting and reconstructing holograph information.

FIG. 9 illustrates the information collecting system utilizing the first method whereby a reference beam is utilized in conjunction with the object beam to record the holographic information about the object scene. In this diagram, white light from a source $S_o$ is modulated by a suitable means 61 and is used to illuminate the object 62. Light from this source is scattered by the object onto the hologram plane 63. Also, a source, $S_r$, of white light is modulated by a suitable means, 61*a*, coherently with $S_o$ and impinges upon the hologram plane at an angle $\theta$. As described in the preceding sections, the light intensity from the object and reference beams form a standing wave pattern at the hologram plane 63. This pattern is then detected by an array of photocells (not shown) positioned at the hologram plane and the output from these photocells are collected by a scanning circuit 64. This information is transmitted over the normal television transmission channels and is received by an ordinary television receiver, 65. The standing wave pattern recorded at the hologram plane 63 is transmitted and reduced so that it is displayed on a television receiver 65. This pattern can be recorded by photographing the TV screen with an ordinary camera, 66, which reduces the pattern still further to the size of the photographic film.

The second stage of this system is illustrated in FIG. 10, which shows the reconstruction of the hologram, which is in the form of a photographic transparency 77. The transparency hologram 77 is illuminated by a beam 78 of light from a point source 78*a*. The hologram acts as a grating which diffracts light into several diffracted orders. These diffracted orders are focused by a lens system 79 to points in the plane of a spatial filter 80. The spatial filter 80 blocks all of the diffracted orders except a desired first order 101 which carries an image of the original object.

The ratio of the modulating wavelength to the wavelength of reconstruction light will be greater than the geometrical reduction in the pattern that occurs in the first stage illustrated in FIG. 9. As will be shown below, the ratio of wavelengths will be about 20,000 while the first stage reduction is about 50. Thus, the image when read out with the short wavelength light will be demagnified by a factor of about $$\left(\frac{20,000}{50}\right)=400$$

In order to conveniently view the image, the image must be magnified, for instance by means of a telescope or, as shown in FIG. 10, by means of a closed circuit TV system including a camera 81 equipped with a telescopic zoom lens. The image is viewed on the TV screen 82.

It will be instructive to describe some of the characteristics of a typical system in order to see the advantages of this type of holographic TV system and also to identify the limitations that may be imposed by present-day technology. This example is not intended in any way to limit the applicability of this invention but only to be illustrative. Assume that the white light sources $S_o$ and $S_r$ are intensity-modulated at a frequency of 30 gigacycles which corresponds to a modulation wavelength of 1 centimeter. Also for this example we shall assume that information is detected at the hologram plane with an array of photocells such that the light intensity is measured at 2000 points in both directions over the hologram plane. This detection can be made with a spacing of $\frac{1}{10}$ of a wavelength or 0.1 centimeter so that the hologram plane will be 200 centimeters on a side, or 6.6 feet. If the hologram plane is scanned at a rate of once per second, a total of $4\times10^6$ values/sec. must be transmitted. After transmission, this information is received by a television receiver and the hologram, or standing wave pattern, is displayed on the television screen. A permanent record of this pattern is recorded on photographic film by an ordinary camera. If a photographic transparency of the standing wave pattern is produced with an overall dimension of 4 centimeters x 4 centimeters, the image can be viewed with visible light. With 1 centimeter modulation and a reference beam angle $\theta$ of about 45°, the spatial frequency of the intensity pattern at the hologram plane 63 is about $\frac{1}{10}$ line/millimeter. In FIG. 9 the standing wave pattern is reduced by a factor of 200/4=50 so that the resulting spatial frequency on the film transparency is about 5 lines/millimeter. A hologram with a spatial frequency of about 5 lines/millimeter can reconstruct an image by means of the telescopic TV camera 81 depicted in FIG. 10.

Thus, this system provides a means for circumventing the requirement that the scene be illuminated with coherent light, as for example from a laser. This system also provides a means for reducing tremendously the time-bandwidth product required by virtue of the fact that holographic information is detected by use of microwave rather than optical frequencies.

In order to illuminate wide scenes, it is sometimes desirable to use more than one source of illuminating light, so that all points on the object are illuminated brightly. Referring to FIG. 11, the setup of FIG. 7 is shown modified so that two sources of light 86 and 87 illuminate the object at different angles. It should be noted, however, that if two sources illuminate the object from two separate positions, intensity fringes will appear where the beams overlap, the spacing of which will depend on the modulating wavelength and the angle of separation. These fringes may or may not be distracting, depending on the value of the wavelength and angular separation. To minimize the portion where the fringes appear, the two sources may be either directed to substantially different portions of the object or may be sequentially switched off and on.

Information required in order to obtain holograms from which images can be reconstructed in full natural color, i.e., multiple images superimposed on each other at different frequencies in the visible spectrum, can be obtained by illuminating the object with different frequency light. In FIG. 12 one means of accomplishing this is illustrated. A light source 91 illuminates the hologram plane 92 with a reference beam 93 and also illuminates an object 94 which diffracts or reflects an object beam 95 to the hologram plane 92. This, so far, is identical to the setup illustrated in FIG. 7. In order to illuminate the object 94 with different frequency light, a rotating color filter wheel 96 is interposed between the light source 91 and the object 94. Alternately, the color filter may be interposed between the object and the detector. The detector utilized to record the intensity pattern at the hologram plane 92 must then be sequenced in synchronism with the rotating color wheel 96 so that it sequentially records a hologram for each frequency of light used to illuminate the object. This color sequence is utilized in the reconstruction process so that the hologram associated with one color can be rendered in that color.

Another method, illustrated in FIG. 13, to obtain multiple holograms at different frequencies, is to illuminate an object 101 with two or more sources of light 102 and 103 that are different colored lights and which are modulated at different frequencies. In the setup as shown in FIG. 13, a reference beam, 104, is incident directly upon the hologram plane, 105, and is modulated at the two different frequencies that are used to modulate the illuminating sources 102 and 103. The multiple holograms which are formed at the hologram plane 105 can then be recorded by detectors that are tuned to pass only the selected modulation frequencies.

Still another method of obtaining multiple holograms with different frequencies is illustrated in FIG. 14. In FIG. 14 a light source 107 illuminates an object 108 with different colored lights by means of a rotating color filter wheel 109 superimposed between the source 107 and the object 108. This couses an object beam of varying light frequencies 110 to be reflected from the object 108 onto the hologram plane 111. It will be noted that this is essentially the same as the operation of the system illustrated in FIG. 12. In the system of FIG. 14 two or more reference sources 112 and 113 are spaced at an angular relationship with respect to each other such that two or more reference beams 114 and 115, respectively, impinge upon the hologram plane 111 at different angles. The illuminating source 107 and the reference wave sources 112 and 113 are modulated with coherent frequencies and the reference sources are sequentially switched on and off in synchronism with rotation of the color filter wheel 109. The resultant is a series of holograms which may be selectively detected at the hologram plane 111, the series of holograms being of different colors due to the different frequency illuminating light used and the angular relationship of the reference sources 112 and 113.

Visible electromagnetic radiation is not the only high frequency illuminating radiation that can be modulated with lower frequency radiation according to the basic principles of this invention. Other electromagnetic radiation, such as X-rays and matter waves such as electron beams, may be modulated at a lower frequency to achieve the results taught by this invention, although it will be obvious that certain types of radiation will be more practical than others.

What is claimed is:

1. A method of producing holographic information comprising the steps of:

illuminating an object with electromagnetic radiation of a first frequency that has been intensity-modulated at a second frequency, the second frequency being lower than the first frequency, and detecting the amplitude and the phase information relating to the second frequency of the radiation emanating from the object by detecting the intensity of the radiation of the first frequency emanating from the object.

2. The method as defined in claim 1 and further including the step of producing a hologram from the detected amplitude and phase information.

3. The method as defined in claim 1 wherein the electromagnetic radiation of a first frequency comprises visible light.

4. The method as described in claim 1 wherein the second modulating frequency lies in the microwave region.

5. The method as defined in claim 1 wherein the electromagnetic radiation of a first frequency comprises visible light and the modulating second frequency lies in the microwave region.

6. The method as defined in claim 1 wherein the electromagnetic radiation of a first frequency comprises X-rays.

7. A method of producing holographic information comprising the steps of:

illuminating an object with electromagnetic radiation of a first frequency that has been intensity-modulated at a second frequency, the second frequency being lower than the first frequency, creating an intensity pattern between electromagnetic radiation reflected from said object and reference electromagnetic radiation whose intensity is modulated coherently with said second frequency, said intensity pattern comprising spatially distributed intensity variations of said electromagnetic radiation of a first frequency, and detecting the amplitude and the phase information relating to the second frequency of the electromagnetic radiation reflected from said object by detecting said intensity pattern.

8. The method as defined in claim 7 and further including the step of producing a hologram from the detected intensity pattern.

9. The method as defined in claim 7 wherein said electromagnetic radiation of said first frequency comprises visible light.

10. The method as defined in claim 9 wherein the intensity variations of said visible light are detected and converted into electrical signals, said electrical signals including the amplitude and phase information of the second frequency.

11. The method as defined in claim 10 and further including the steps of transmitting and subsequently receiving said electrical signals.

12. The method as defined in claim 11 and further including the step of reconverting said received electrical signals into a proportional spatially distributed pattern and producing a hologram from said pattern.

13. A method of producing holographic information comprising the steps of:

illuminating an object with electromagnetic radiation of a first frequency that has been intensity-modulated at a second frequency, the second frequency being lower than the first frequency, detecting the intensity variations of radiation of the first frequency reflected from said object, converting said detected intensity variations into proportional first electrical signals, mixing said first electrical signals with a second electrical signal coherent with said second frequency so as to produce a resultant electrical signal containing the amplitude and the phase information relating to said second frequency of said electromagnetic radiation reflected from said object.

14. The method as defined in claim 13 and further including the step of producing a hologram from said resultant electrical signal.

15. The method as defined in claim 13 and further including the steps of transmitting and subsequently receiving said resultant electrical signal.

16. The method as defined in claim 15 and further including the step of producing a hologram from the amplitude and phase information of the second frequency included in said received electrical signal.

17. The method as defined in claim 12 wherein the proportional spatially distributed pattern comprises a visible light display, and the step of producing a hologram from said pattern comprises photographing said visible light display to produce a film transparency hologram.

18. The method as defined in claim 16 wherein the step of producing a hologram from the amplitude and phase information includes the steps of:

converting said information from an electrical signal into a proportional visible light display, and photographing said visible light display to produce a film transparency hologram.

19. The method as defined in claim 17 and further including the step of producing an image of said object by illuminating said film transparency hologram with coherent radiation.

20. The method as defined in claim 19 and further including the step of producing an image of said object by illuminating said film transparency hologram with coherent radiation.

21. The method of producing holographic information comprising the steps of:

illuminating an object with a plurality of angularly displaced sources of electromagnetic radiation of a first frequency, each source being intensity-modulated at a second and lower frequency, detecting the amplitude and the phase information relating to said second frequency of said radiation emanating from said object by detecting the intensity of the radiation of said first frequency emanating from said object.

22. The method as defined in claim 21 wherein said plurality of sources are sequentially operated such that said object is illuminated by only one of said plurality of sources at a time.

23. The method as defined in claim 21 wherein each of said plurality of sources is directed to a substantially different portion of said object.

24. The method as defined in claim 21 and further including the step of producing a hologram from the detected amplitude and phase information.

25. The method of producing multi-colored holographic information comprising the steps of:

reflecting multi-colored radiation from said object, said radiation being intensity-modulated at a much lower frequency than said multi-colored radiation, detecting the amplitude and the phase information relating to said lower frequency by detecting the intensity of the radiation emanating from said object for each color.

26. The method as defined in claim 25 and further including the step of producing a hologram for each color from the detected amplitude and phase information.

27. The method of producing multi-colored holographic information comprising the steps of:

iluminating an object with a plurality of angularly displaced sources of light radiation, each source being of a different color and being intensity-modulated at a lower frequency than said light radiation, each modulating frequency being different than the other modulating frequencies, detecting the amplitude and phase information relating to each modulating frequency utilized by detecting the intensity of the light radiation reflected from said object for each respective source of illuminating light radiation.

28. The method as defined in claim 27 and further including the step of producing a hologram from the detected amplitude and phase information relating to each modulating frequency.

29. A system for producing holographic information comprising:

means for illuminating an object with electromagnetic radiation of a first frequency, means for intensity modulating said electromagnetic radiation at a second frequency, the second frequency being lower than the first frequency, and means for detecting the intensity of the radiation of the first frequency emanating from the object to detect the amplitude and the phase information relating to the second frequency.

30. A system for producing holographic information comprising:

means for illuminating an object with electromagnetic radiation of a first frequency, means for intensity modulating said electromagnetic radiation at a second frequency, the second frequency being lower than the first frequency, means for detecting the intensity variations of radiation of the first frequency reflected from said object, means for converting the detected intensity variations into proportional first electrical signals, and means for mixing the first electric signals with a second electrical signal coherent with said second frequency so as to produce a resultant electrical signal containing the amplitude and the phase information relating to said second frequency of said electromagnetic radiation reflected from said said object.

31. A method of producing a hologram capable of reconstructing an image of an object with visible light comprising the steps of:

illuminating an object with electromagnetic radiation of a first frequency that has been intensity-modulated at a second frequency, the second frequency being lower than the first frequency, creating an intensity pattern between electromagnetic radiation reflected from said object and reference electromagnetic radiation whose intensity is modulated coherently with said second frequency, said intensity pattern comprising spatially distributed intensity variations of said electromagnetic radiation of a first frequency, demagnifying the intensity pattern by a ratio substantially equal to the ratio of the frequency of the visible light to be used in reconstructing the image to said second frequency, and recording the demagnified intensity pattern to produce a hologram.

32. The method according to claim 31 including the further step of reconstructing an image of the object by illuminating the hologram with visible light to produce an image of the object.

References Cited

UNITED STATES PATENTS 3,400,363 9/1968 Silverman ............ 340—3

ROBERT L. GRIFFIN, Primary Examiner

R. K. ECKERT, Jr., Assistant Examiner

U.S. Cl. X.R.

178—6.7; 350—3.5